United States Patent
Lefebvre

(10) Patent No.: US 7,123,619 B1
(45) Date of Patent: Oct. 17, 2006

(54) TELECOMMUNICATION NETWORK AND A METHOD FOR CONTROLLING SUCH NETWORK

(75) Inventor: Pascal Lefebvre, Brussels (BE)

(73) Assignee: ALCATEL, Paris (FR)

( * ) Notice: Subject to any disclaimer, the term of this patent is extended or adjusted under 35 U.S.C. 154(b) by 619 days.

(21) Appl. No.: 09/697,492

(22) Filed: Oct. 27, 2000

(30) Foreign Application Priority Data

Nov. 19, 1999 (EP) .................................. 99402883

(51) Int. Cl.
  *H04L 12/26* (2006.01)
  *H04J 3/14* (2006.01)
  *G08C 15/00* (2006.01)
  *G06F 11/00* (2006.01)

(52) U.S. Cl. ........................ 370/395; 370/230; 370/443

(58) Field of Classification Search ........ 370/230–236, 370/230.1, 231, 352–412, 447–468, 229; 375/220, 240–259, 260–285; H04Q 11/04; H01J 3/24; H04L 12/56, 12/28, 12/26
See application file for complete search history.

(56) References Cited

U.S. PATENT DOCUMENTS

| | | | |
|---|---|---|---|
| 5,490,138 A | | 2/1996 | Niestegge et al. |
| 5,570,355 A | * | 10/1996 | Dail et al. .................. 370/352 |
| 5,812,526 A | * | 9/1998 | Chang et al. ............... 370/230 |
| 5,862,136 A | * | 1/1999 | Irwin ....................... 370/395.4 |
| 5,872,645 A | * | 2/1999 | Proctor ........................ 398/99 |
| 5,953,344 A | * | 9/1999 | Dail et al. .................. 370/443 |
| 5,978,374 A | * | 11/1999 | Ghaibeh et al. ....... 370/395.43 |
| 6,167,095 A | * | 12/2000 | Furukawa et al. .......... 375/285 |
| 6,212,163 B1 | * | 4/2001 | Aida ........................... 370/230 |
| 6,212,185 B1 | * | 4/2001 | Steeves et al. .............. 370/392 |
| 6,282,197 B1 | * | 8/2001 | Takahashi et al. ....... 370/395.1 |
| 6,310,909 B1 | * | 10/2001 | Jones ......................... 375/220 |
| 6,400,687 B1 | * | 6/2002 | Davison et al. ............. 370/236 |
| 6,426,964 B1 | * | 7/2002 | Proctor ....................... 370/537 |
| 6,529,479 B1 | * | 3/2003 | Suzuki .................... 370/236.1 |
| 6,563,829 B1 | * | 5/2003 | Lyles et al. ............ 370/395.21 |
| 6,594,265 B1 | * | 7/2003 | Etorre et al. ........... 370/395.51 |
| 6,597,689 B1 | * | 7/2003 | Chiu et al. .................. 370/354 |

FOREIGN PATENT DOCUMENTS

EP  0 814 632 A2  12/1997
EP  0 944 281 A2  9/1999

OTHER PUBLICATIONS

The ATM Forum Technical Committee, Traffic Management Specification Version 4.0, af-tm-0056.000, Apr. 1996, ATM Forum.*
VB5.1 ETSI standard EN 301 005-1 v1.1.4 (May 1998).
VB5.2 ETSI standard EN 301 217-1 v1.2.2 (Sep. 1999).

* cited by examiner

*Primary Examiner*—Man U. Phan
(74) *Attorney, Agent, or Firm*—Sughrue Mion, PLLC

(57) ABSTRACT

An ATM network, in which the downward data rate, from the network to the users, is greater than the upward data rate, from the users to the network. Multiplexers are provided for establishing connections, constituting virtual channels, between users and the network; the virtual channels are grouped into virtual paths. In each multiplexer close to the user, the bandwidth allocated to each downward virtual path is variable under the control of a call control means provided upstream in a switching node, and the upward virtual channels have a fixed bandwidth. Preferably, in the downward direction, each virtual channel is assigned a permanent or semi permanent quality of service.

4 Claims, 1 Drawing Sheet

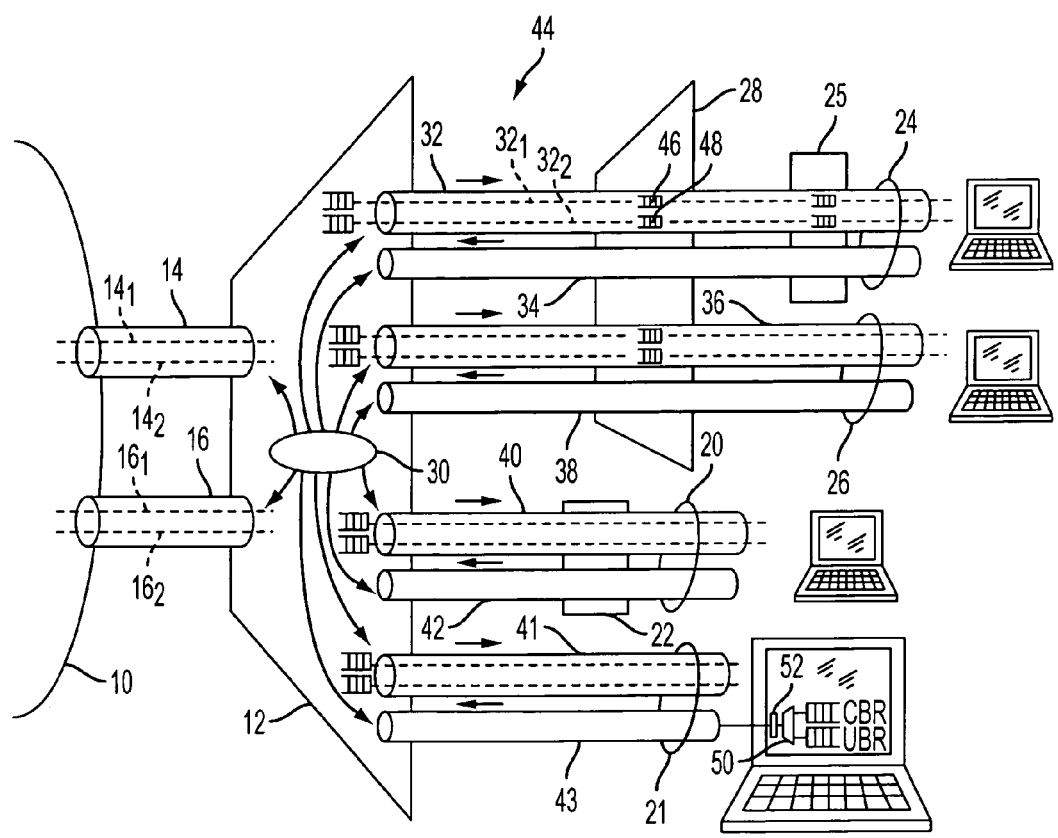

TELECOMMUNICATION NETWORK AND A METHOD FOR CONTROLLING SUCH NETWORK

BACKGROUND OF THE INVENTION

The invention relates to a telecommunication network, a method of controlling such network and to a component of such network.

In order to establish communications between subscribers, a telecommunication network comprises several kinds of multiplexers in series. Generally, the first multiplexer which is connected to the network is called a switching node (SN) and the multiplexer which is the closest to a subscriber is called an access node (AN). An access node may be also connected to a switching node through another multiplexer which will be called here a subswitching node or subscriber-switching node.

The switching node and subswitching node are generally controlled by the network operator. The access nodes are located in subscribers' installations; they are generally owned or leased by subscribers. As access nodes and subswitching nodes are sold or leased in great numbers, it is preferable that their cost be limited, i.e. that they be realized with the greatest simplicity; in order to achieve this goal, the most complex control means are installed in the switching node.

For this purpose, the VB5.1 ETSI standard recommends the following network structure: each user or subscriber is connected through an access node or a subswitching node to a switching node via virtual paths (VP). A virtual path comprises generally several virtual channels (VC). A given bandwidth (i.e. a given bit rate) is allocated to each virtual path; this bandwidth may have different values in the upward and the downward directions. The upward direction is from the user to the network and the downward direction is from the network to the user; the downward direction needs generally more bandwidth than the upward direction. In fact, in the upward direction, simple requests are sent and in the downward direction important files are generally sent.

For instance, 8 Mbits/sec. is allocated to the downward direction (from the switching node to the subscriber node) and 800 Kbits/sec. is allocated to the upward direction (from the access node to the switching node).

If, with this VB5.1 standard, the total bandwidth is (downward) 8 Mbits/sec. between the switching node and the subscriber node and if there are 8 VP, each one has a bandwidth of 1 Mbit/sec., if the resources are distributed equally.

Therefore, the subscriber node (access and/or subswitching node) is very simple because it does not comprise any control means for controlling the connection and the bandwidth. However, this simplicity has the drawback that it is not possible to allocate temporarily more bandwidth to a VP, i.e. to a user.

When a user has the possibility to transmit and receive data with different qualities of service (QOS), i.e. with different priorities, one or several virtual channels VC is allocated to each quality of service. In that case, the corresponding virtual path must be provided with control means, generally called "shaping control means", which take into account the bandwidth of each virtual channel in order to limit the total bandwidth of the virtual path to the bandwidth which is allocated to this virtual path. The shaping control means are expensive. Therefore, the goal of simplicity and low cost for the users' equipment is no more achieved.

In order to allocate dynamically the bandwidth to each VC, it is possible to use another ETSI standard named VB5.2. But the drawback of this technology is that the access node or subswitching node is complex and, therefore, more expensive. In fact, in this standard, the access or subswitching node controls dynamically the up and down connections and may provide instantaneously the requested bandwidth to each VC under the control of call control means provided in the switching node. It can be easily understood that the high cost stems from the fact that, for such call processing in the access node or subswitching node, it is necessary to use important memory means and processing power.

In the network according to the invention, the access node or subswitching node is almost as simple as in the VB5.1 standard but provides the possibility to allocate dynamically the bandwidth to each VP.

The invention takes advantage of the asymmetrical character of the traffic.

The network according to the invention is characterized in that, in the downward direction, the bandwidth allocated to each virtual path is variable under the control of means provided upwards, i.e. for instance, in the switching node, and in that, in the upward direction, each VP has a fixed bandwidth.

Therefore, it is not necessary to provide the users' equipment (access node or subswitching node) with means controlling the bandwidth. In other words, the users' equipment may be as simple as with the VB5.1 standard, but the invention provides the possibility to modify dynamically the bandwidth of each virtual path.

The equipment for controlling the downward bandwidth is preferably under the control of the network operator and is installed, as mentioned above, for instance, in the switching node. This control equipment is provided with information about the maximum bandwidth of each user, i.e. generally of each virtual path, and about the maximum bandwidth at the interface between the switching node and the access or subscriber node. In fact, the bandwidth of each user is an information which is given at the time of subscription and the bandwidth at the interface between the switching node and all the users' node is a characteristic feature of the switching node.

Therefore, for each downward connection, between the switching node and the users, the control equipment allocates the necessary bandwidth to each user, i.e. to each virtual path, taking into account the maximum bandwidth which may be allocated to each user and the maximum bandwidth of the interface.

It may be also possible to control upstream the bandwidth allocated downstream to each virtual channel. This control may be performed in the following way:

The downstream bandwidth of all VCs routed to a given subscriber is checked and compared with the bandwidth allocated for the interface with that specific user. The downstream bandwidth of all VCs routed to a subswitching node is checked and compared with the bandwidth provided by the interface between the switching node and the subswitching node. By combining these two checks, the downstream traffic will not be congested at the two "bottleneck" points, i.e. switching—subswitching node interface and subscriber's interface.

In order to avoid complex shaping control means in the downward direction, a quality of service, i.e. a priority, is assigned to each virtual channel in this downward direction. In other words, the virtual channels of each virtual path are separated in subsets, each subset having a given quality of service. For instance, a first subset of virtual channels corresponds to CBR (Constant Bit Rate), a second subset to UBR (Unspecified Bit Rate), a third subset to VBR real time and a fourth subset to VBR non real time (VBR means "Variable Bit Rate").

The allocation of qualities of services between the channels of each virtual path may be permanent or semi permanent. In a semi permanent allocation, the qualities of services of the virtual channels may be modified from time to time, for instance when the user requests a modification of his subscription.

In the upward direction, it may be necessary to provide the user with shaping control means when the user has the possibility to transmit data with different qualities of services, but these shaping means may be relatively simple due to the limited bandwidth allocated upwards. In fact: In order to guarantee the QOS of a connection, the user's source must comply with the established traffic contract and provide shaping at VC level. In the present embodiment, some aggregate shaping may be necessary to comply with the upstream VP bandwidth. This condition may be obtained in a very easy way, by imposing an upstream line rate equal to the upstream VP bandwidth, no dedicated shaper being needed for the aggregate flow.

SUMMARY OF THE INVENTION

In brief, the invention relates to a telecommunication network, preferably an ATM network, in which the downward data rate, from the network to the users, is greater than the upward data rate, from the users to the network. Multiplexers are provided for establishing connections, constituting virtual channels, between users and the network; the virtual channels are grouped into virtual paths. In each multiplexer close to the user, the bandwidth allocated to each downward virtual path is variable under the control of means, such as call control means, provided upstream in a switching node and the upward virtual paths have a fixed bandwidth.

According to an embodiment, the control means is provided with a memory containing information representing the maximum bandwidth allocated downwardly to each user and representing the bandwidth allocated downwardly to the interface, or the interfaces, between the users' multiplexer and the switching node, this control means using these information in order to limit the bandwidth allocated to each user to its authorized maximum, and in order to limit the total bandwidth allocated to the virtual paths to a value which is at most equal to the interface, or to interfaces, bandwidth.

A control of the upward bandwidth is also needed to check whether the bandwidth allocated upstream for VC's still fits within the fixed bandwidth associated with the upstream VP.

In an embodiment, in the downward direction, each virtual channel is assigned a permanent or semi permanent quality of service.

In an embodiment, the multiplexer which is the closest to the user has, for each virtual channel of the downward direction, a buffer memory for ATM cells with a given priority.

The invention relates also to a multiplexer constituting a node of a telecommunication network for transmitting ATM cells, this node being close to a user. In this multiplexer, each downward virtual path has a plurality of virtual channels to each of which is allocated a given quality of service.

In an embodiment, to each virtual channel is assigned a buffer memory for the ATM cells to which is assigned a priority corresponding to the given quality of service.

In an embodiment, the quality of service is selected among the following qualities of service: constant bit rate (CBR), variable bit rate (VBR) real time, variable bit rate non real time, and unspecified bit rate (UBR).

The invention relates also to a method for controlling a telecommunication network, in which connections are realized by virtual channels grouped into virtual paths. The bandwidth of the downward virtual paths are controllable dynamically from an upstream controller and the bandwidth of each upward virtual path is fixed.

In an embodiment, to each downward virtual channel, is assigned a given quality of service.

BRIEF DESCRIPTION OF THE DRAWING

Other features and advantages of the invention will appear with the description of certain of its embodiments, this description being made in connection with the appended drawing, wherein the single FIGURE is a schematic representation of a part of a network according to the invention.

DETAILED DESCRIPTION OF THE INVENTION

The example which will be described corresponds to an ATM (Asynchronous Transfer Mode) network wherein, as well known, data are transmitted in digital form, the digital data being sent into packets or cells having a fixed number of bits. To each kind of data is associated a quality of service (QOS) which corresponds to a level of priority in the transmission. The highest priority is given to CBR, i.e. constant bit rate data. These data correspond, for instance to the real time transmission of video programs. The second kind of data is VBR, or variable bit rate, real time, which is, for instance, the transmission of speech. The third kind of data is VBR non real time, which correspond, for instance to file transfers for business users and the last kind of data is UBR or unspecified bit rate which corresponds, for example, to the transmission of electronic mail or web surfing. Other qualities of services may be also available with ATM cells. In other words, the invention is not limited to CBR, VBR and UBR.

In the example represented on the drawing, the ATM network 10 is connected to a switching node 12 through virtual paths 14 and 16, each virtual path comprising several virtual channels. For the sake of simplicity, only two virtual channels have been represented for each virtual path. These virtual channels have the references $14_1$ and $14_2$ for virtual path 14 and the references $16_1$ and $16_2$ for the virtual path 16.

The switching node 12 connects these virtual paths 14, 16 to a plurality of users also through virtual paths.

In the simplified example of the drawing, the switching node 12 is connected: to an user 20 through an access node 22, directly (without an access node) to an user 21, and to two users 24, 26 through a subswitching node 28. The subswitching node 28 is connected to the user 24 through an access node 25 and is connected directly to the user 26. In general, each switching node 12 is connected to several hundreds or several thousands of users, either directly through access nodes or indirectly through subswitching nodes. Usually, a subswitching node corresponds to a limited number of users, for instance eight.

The access nodes 22 and 25, the subswitching node 28 and the switching node 12 are multiplexers, the goal of which is to establish communications between users and the network 10 and/or between users connected to the same node.

These multiplexers, i.e. the establishment of communications, are controlled by a call control circuit or call control function or means 30 which is usually installed in the switching node 12.

The connections between the user 24 and the switching node 12 are obtained through a downward virtual path 32 and through an upward virtual path 34. Similarly, the connections between the user 26 and the switching node 12 are realized through a downward virtual path 36 and through an upward virtual path 38. The connections between the user 20 and the switching node 12 are realized through a downward virtual path 40 and an upward virtual path 42.

For the connections between the user 21 and the switching node 12 a downward VP 41 and an upward VP 43 are provided.

The upward virtual paths 34, 38, 42 and 43 have a fixed bandwidth, i.e. a given maximum bit rate, but the downward virtual paths 32, 36, 40 and 41 have a variable bandwidth controlled by means 30.

For the control of the bandwidth of the downward connections, the means 30 is provided with a memory (not shown) containing an information representing the maximum downward bandwidth allocated to each user and the maximum downward bandwidth allocated to the interface 44 between the switching node 12 and the subswitching node 28.

Knowledge of the maximum upward bandwidth associated with the upstream VP is also required to enforce the upstream allocated to VCs remains within the VP limits.

The call control means 30 has, in addition to its classical function of establishing the connections, the role of allocating the bandwidth for the downward connections, i.e. from the network 10 to the users.

Upstream bandwidth allocation is also performed within the VP bandwidth (standard VB5.2 behavior).

The connections which are established are connections through virtual channels. In the simplified example represented on the drawing, each virtual path has two virtual channels. For instance, the virtual path 32 has two virtual channels $32_1$ and $32_2$ respectively.

When a new downward connection is established, the call control means 30 checks that the bandwidth which is allocated to all the users is at most equal to the bandwidth allocated to the interface 44 and this call control function 30 checks also that the bandwidth which is globally allocated to each user is at most equal to the maximum bandwidth authorized for this user.

According to another aspect of the invention, each virtual channel between the switching node 12 and the users is allocated a quality of service (QOS). For the sake of simplicity, it will be assumed here that only two qualities of services are available: CBR and UBR. For instance, the virtual channel 321 corresponds to CBR and the virtual channel $32_2$ corresponds to UBR.

For this purpose, to each virtual channel is associated, in each node, a buffer memory in which the cells have a given a priority with respect to the cells in the buffer memory associated with the other virtual channel. For instance, the buffer memory 46 is, in the subswitching node 28, associated with virtual channel $32_1$ (CBR), and a buffer memory 48 is associated with the virtual channel $32_2$ corresponding to the UBR quality of service. The cells in buffer memory 46 have, in general, a higher priority than the cells in buffer memory 48.

The association of each virtual channel with a given quality of service may be realized permanently, i.e. it may not be modified, or may be realized semi permanently, i.e. it may be modified from time to time. For instance, the subswitching node 28 may be such that the number of virtual channels having a given quality of service may be modified under given circumstances, such as a change of subscription contract.

In the upward direction, the bandwidth is much more limited than in the downward direction, for instance ten times less and to each user is allocated a fixed bandwidth which may not be varied. In this upward direction, the network is similar to the network of the VB5.1 standard. It is recalled here that, for checking that each user does not transmit more bandwidth than it is authorized, a police function (not shown) is provided on the upward virtual path between the user and the closest node 28 for instance. This police function checks also that the sum of the fixed upward bandwidths of the users be at most equal to the upward bandwidth of interface 44.

In the upward direction, each virtual path 34, 38, 42, 43 has also different virtual channels. However, contrary to the downward direction, a quality of service is not assigned to each of these virtual channels. But, of course, each user has the possibility to transmit cells having different qualities of services, for instance CBR and UBR. Therefore, as represented, the user, 21 for instance, provides the corresponding CBR and UBR cells to a multiplexer 50 and to a shaping control circuit 52. In an embodiment, no circuit 52 is provided, but the upstream line is configured in such a way that the upstream rate is intrinsically limited to the upstream VP bandwidth.

It is to be noted here that no shaping circuit is provided for the downward direction, neither in the switching node 12, nor in the subswitching node 28, nor in the access node 22 or 25. No specific control circuit is provided in the nodes 28, 22 and 25.

Compared to VB5.1, the users' nodes 28, 22 and 25 have only the added complexity of a given "marking" of each virtual channel with a quality of service for the downward direction.

The invention claimed is:

1. A telecommunication network, having a downward data rate from the network to users greater than an upward data rate from the users to the network, the telecommunication network comprising multiplexers for establishing connections, constituting virtual channels between users and the network, the virtual channels being grouped into virtual paths, wherein, in each multiplexer close to the user, a bandwidth allocated to each downward virtual path is variable under the control of a call control means provided upstream in a switching node, and wherein upward virtual paths have a fixed bandwidth, wherein the call control means is provided with a memory containing information representing a maximum bandwidth allocated downwardly to each user and representing a bandwidth allocated downwardly to one or more interfaces between the users' multiplexer and the switching node, the call control means using information to limit the bandwidth allocated to each user to its authorized maximum, and to limit a total bandwidth allocated to the downward virtual paths to a value not greater than the bandwidth of the one or more interfaces.

2. A network according to claim 1, wherein, in a downward direction, each virtual channel is assigned a quality of service.

3. A network according to claim 2, wherein the multiplexer closest to the user has, for each virtual channel of the downward direction, a buffer memory for ATM cells of a given priority.

4. An ATM network comprising:

a plurality of multiplexers for establishing connections between a plurality of users and the ATM network, wherein the multiplexers constitute virtual channels; and a call control circuit provided upstream of the ATM network in a switching node, wherein:

a downward data rate, from the ATM network to the users, is greater than an upward data rate, from the users to the network, the virtual channels are grouped into virtual paths, a bandwidth allocated to a downward virtual path from the ATM network to one of the plurality of users, is variably controlled by the call control circuit, an upward virtual path, from one of the plurality of users to the ATM network, has a fixed bandwidth, the call control circuit is provided with a memory containing information representing a maximum bandwidth allocated downwardly to each user and representing a bandwidth allocated downwardly to an interface that is between the users' multiplexer and the switching node, and the call control circuit utilizes the information to limit a bandwidth of the user to an authorized maximum bandwidth allocated to each user, and to limit a total bandwidth allocated to the downward virtual paths to a value which is not greater than the bandwidth of the interface.

* * * * *